United States Patent [19]

Oishi et al.

[11] Patent Number: 5,619,317
[45] Date of Patent: Apr. 8, 1997

[54] LIGHT-WAVE DISTANCE METER BASED ON LIGHT PULSES

[75] Inventors: Masahiro Oishi; Fumio Ohtomo, both of Tokyo, Japan

[73] Assignee: Kabushiki Kaisha TOPCON, Tokyo, Japan

[21] Appl. No.: 342,264

[22] Filed: Nov. 18, 1994

[30] Foreign Application Priority Data

Nov. 18, 1993 [JP] Japan ................................ 5-314380
May 16, 1994 [JP] Japan ................................ 6-126756

[51] Int. Cl.$^6$ ................................ G01C 3/08; G01S 17/00
[52] U.S. Cl. .................... 356/5.05; 356/5.07; 356/5.08
[58] Field of Search ............................. 356/5.07, 5.08, 356/5.05; 342/136, 93, 94, 97

[56] References Cited

U.S. PATENT DOCUMENTS

| | | | |
|---|---|---|---|
| 3,900,261 | 8/1975 | Wingate | 356/5.03 |
| 4,344,705 | 8/1982 | Kompa et al. | 356/5.08 |
| 5,102,219 | 4/1992 | Skagerlund | 356/5.08 |
| 5,179,286 | 1/1993 | Akasu | 250/559.38 |
| 5,353,228 | 10/1994 | Geiss et al. | 364/458 |

FOREIGN PATENT DOCUMENTS

| | | | |
|---|---|---|---|
| 279959A | 6/1990 | Germany | G01S 17/00 |
| 3-163387 | 7/1991 | Japan | G01S 17/10 |
| 6-138230 | 5/1994 | Japan | G01S 17/10 |

*Primary Examiner*—Thomas H. Tarcza
*Assistant Examiner*—Pinchus M. Laufer
*Attorney, Agent, or Firm*—Brumbaugh, Graves, Donohue & Raymond

[57] ABSTRACT

In a light-wave distance meter based on light pulses, a light pulse radiation device radiates light pulses emitted by a light source device to a target of measurement, a light reception device receives reflected light pulses from the target, a sampling device samples reception signals, a timing device applies a dither of a certain range to the light pulse emission timing and sampling timing, a cumulative memory device stores sampled signals at a certain interval cumulatively, and a computation device calculates the distance to the target. The distance meter is capable of measuring the position of received light pulses at a resolution higher than the sampling timing.

16 Claims, 15 Drawing Sheets

$Ne = 4$   $Nc = [T_3(Ne-1)/T_1] + 1 = 4$   $k = 0 \sim 4$ $Ne = 4$  $Nc = [T_3(Ne-1)/T_1] + 1 = 3$  $k = 0 \sim 3$

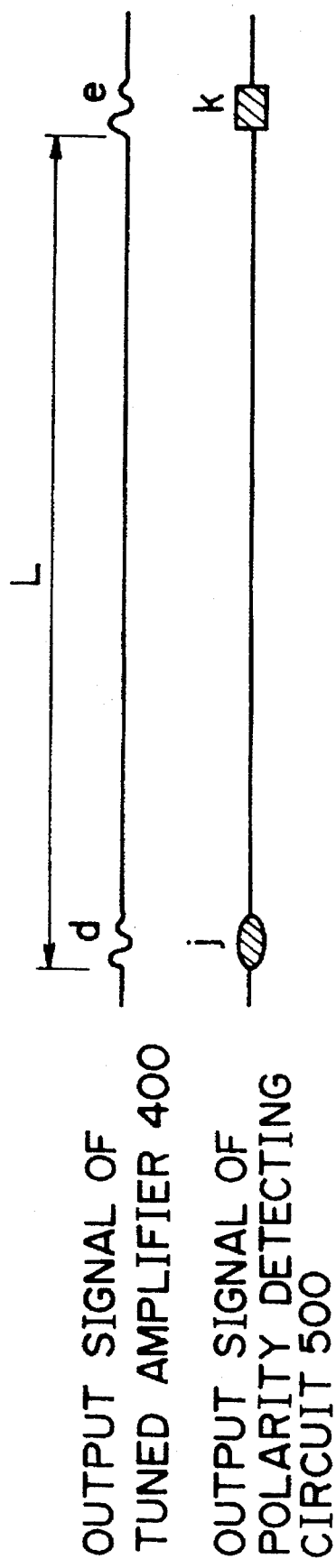

LIGHT-WAVE DISTANCE METER BASED ON LIGHT PULSES

BACKGROUND OF THE INVENTION

The present invention relates to a light-wave distance meter based on light pulses, and particularly to a light-wave distance meter based on light pulses which detects the time interval of return light pulses accurately by means of a relatively simple circuit arrangement and enables such a long distance measurement in which the noise dominates over the signal.

Conventional light-wave distance meters are designed to receive an echo light pulse returning from a corner cube prism that is placed at a target of measurement.

The basic principle of these conventional light-wave distance meters will first be explained with reference to FIG. 10. A light emission means is activated by an emission timing signal a', and it emits a light pulse b'. The radiated light pulse b' is reflected by the measurement target, and thereafter it is received by a light reception means and converted into a return pulse signal c'. The return pulse signal c' is converted analog to digital in response to clock pulses d', and the resulting data is stored in a memory. These operations are repeated for several emission light pulses b', and the stored data are averaged. The averaged data e' in the memory has its addresses for points on the waveform corresponding to measured values of the distance to the target, and the distance L from the distance meter to the target is calculated from the address A of the peak value of the data as follows.

$$L=(A*C)/(f_s*2) \quad (1)$$

where C is the velocity of light, and $f_s$ is the frequency of the clock signal d'. In the formulas herein, an asterisk (*) denotes multiplication.

However, the conventional light-wave distance meters based on light pulses have their measuring accuracy depending on the resolution of detection of the return light pulse, and therefore these distance meters need to have a sampling clock period for A/D conversion small enough relative to the width of the return pulse signal c' and need to have an A/D converter with a large number of bits. Specifically, in case the light emission means is a pulsed laser diode, which generally has a light pulse emission width of around 10 ns, the clock signal d' must have a frequency of several hundred MHz. The need of a very fast A/D converter results in an expensive distance meter.

Moreover, the conventional light-wave distance meters are designed to average stored data produced from several radiation light pulses b' after receiving the last radiation light pulse, and this calculation process imposes a great load to the computation means. Specifically, in the case of distance measurement based on 16 consecutive light pulses b' with a clock signal d' of 300 MHz for a maximum measurable distance of 1000 meters, the data averaging process needs to take place 2000 times, resulting in a long distance measuring time.

Although a conceivable technique for an enhancement of measuring accuracy is the interpolation process between two clock pulses d' for determining the centroid of the return pulse signal c', the distortion of the signal c' can be a problem. In case the return pulse signal c' includes frequency components above the range of detection by the clock signal d', a cyclic linearity error will emerge in the result of distance measurement. Specifically, in case the return pulse signal f' is a triangular wave as shown in FIG. 11, the execution of A/D conversion with clock pulses g' for the signal f' does not produce a difference in distance between data h' and i' in the memory, but it merely exhibits a variation in the quantity of light. It is generally very difficult to control the output waveform of a pulsed laser diode having a pulse width of several tens of ns, and therefore the linearity error of the distance measurement result is dependent on the characteristics of the laser diode as a light emission means.

On this account, there has been an earnest desire for a light-wave distance meter based on light pulses which does not use a fast expensive A/D converter, does not depend on the characteristics of a pulsed laser diode in regard to the linearity error, and reduces the time of distance measurement.

BRIEF DESCRIPTION OF THE DRAWINGS

FIGS. 9a and 9b are diagrams used to explain the principle of the second variant embodiment;

FIG. 13 is a block diagram used to explain the cumulation means based on a fourth variant embodiment of this invention.

DESCRIPTION OF THE PREFERRED EMBODIMENTS

Figure 1:
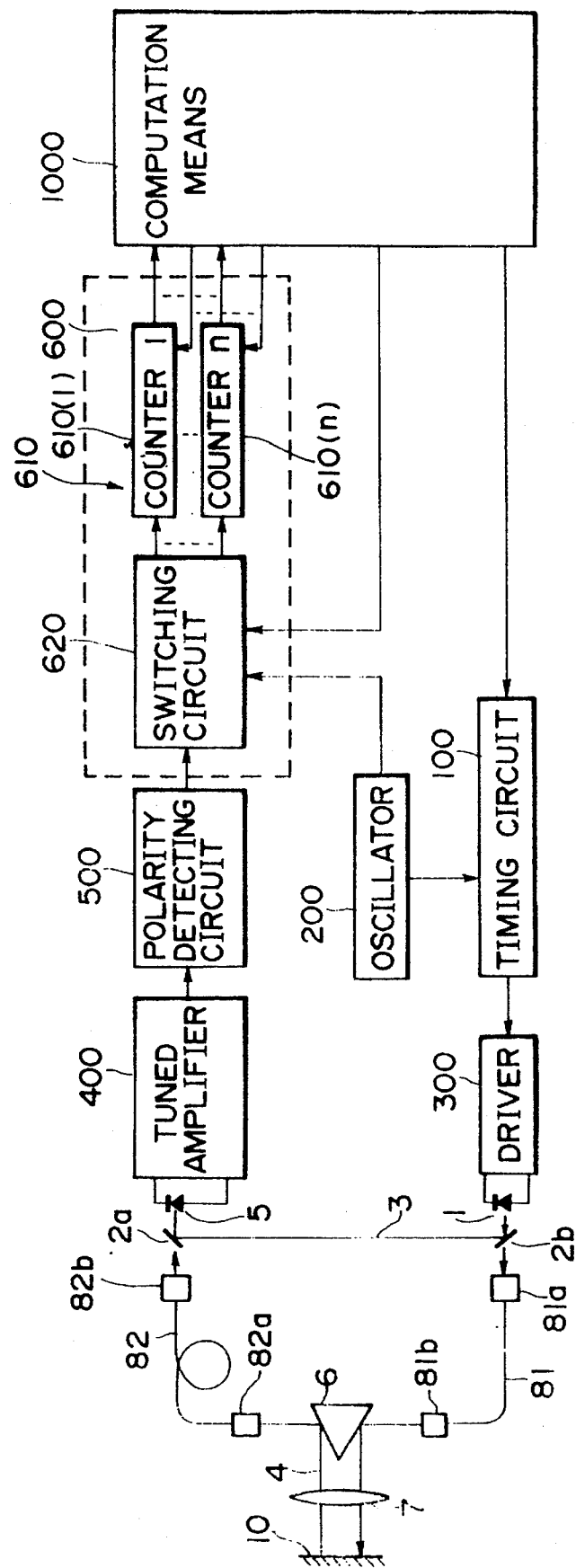
FIG. 1 is a block diagram of the light-wave distance meter based on light pulses according to an embodiment of this invention.

An embodiment of this invention will be explained with reference to the drawings. Initially, the arrangement of the optical system of the light-wave distance meter based on this embodiment will be explained with reference to FIG. 1.

The optical system of the light-wave distance meter includes a laser diode 1, a pair of half-mirrors 2a and 2b used to split the light path, an internal light path 3, an external measuring light path 4, an avalanche photodiode or APD 5, a prism 6, and an objective lens 7. Light pulses emitted by the laser diode 1 are conducted by a sending optical fiber 81 to the prism 6, and return light pulses from a target of measurement 10 are conducted by a receiving optical fiber 82 to the APD 5.

The sending optical fiber 81, prism 6 and objective lens 7 compare to light radiation means.

The laser diode 1, which compares to a light source device, is a pulsed laser diode, and it can generate a laser pulse wave having a relatively large peak power with a duty-cycle of about 0.01%. The half-mirrors 2a and 2b split the light path of the laser pulses from the laser diode 1 into the internal light path 3 and external measuring light path 4.

The APD 5, which compares to a light reception device, can be any transducer that receives a pulsed light beam emitted by the laser diode i and converts it into a reception signal.

An optical fiber cable can be including the sending optical fiber 81 and receiving optical fiber 82 for conducting the radiation light pulses and return light pulses.

The radiation light pulses emitted by the laser diode 1 and passing through the half-mirror 2b are led to the inlet 81a of the sending optical fiber 81. The radiation light pulses coming out of the outlet 81b of the sending optical fiber 81 are reflected by the prism 6 and radiated by the objective lens 7 to the measurement target 10.

The light pulses from the objective lens 7 are reflected by the measurement target 10, and thereafter received by the same objective lens 7. The return light pulses are reflected by the prism 6 and led to the inlet 82a of the receiving optical fiber 82. The return light pulses coming out of the outlet 82b of the receiving optical fiber 82 are incident on the APD 5. The light path of the radiation light pulses and return light pulses between the prism 6 and measurement target 10 forms the external light path 4.

The radiation light pulses that are reflected by the half-mirrors 2a and 2b are incident on the APD 5, and this light path forms the internal light path 3.

The light pulses incident on the APD 5 are converted into electric current pulses. The reception signals derived from the return light pulses from the distant measurement target 10 are so weak that they are dominated by a noise component and cannot undergo direct A/D conversion and data processing.

Next, the electrical circuit of the light-wave distance meter of this embodiment will be explained in detail.

The circuit consists of a timing circuit 100, an oscillator 200, a driver 300, a tuned amplifier 400, a polarity detecting circuit 500, a cumulation means 600, and a computation means 1000.

The timing circuit 100, which compares to a timing device, operates on the driver 300 in accordance with the signal from the computation means 1000 and the clock signal from the oscillator 200 to energize the laser diode 1 so that it emits light pulses.

The timing circuit 100 has a function of delaying at random within a prescribed range $\Delta T$ the emission timing signal, which is originally responsive to the signal from the computation means 1000 and the clock signal from the oscillator 200, so that light pulses are generated virtually evenly within the delay range $\Delta T$. The delayed emission timing signal activates the driver 300, and the laser diode 1 emits light pulses repeatedly. The delay range $\Delta T$ compares to a prescribed range of dither.

The oscillator 200 supplies the clock signal to the cumulation means 600 and timing circuit 100.

The driver 300 energizes the laser diode 1 pulsatively in response to the emission timing signal provided by the timing circuit 100, and it emits light pulses.

The tuned amplifier 400, which compares to a band-pass amplifying means, converts the current pulses from the APD 5 into a voltage signal having a damped oscillation waveform and amplifies the voltage signal. The damped oscillation waveform converted by amplifier 400 is delivered to the polarity detecting circuit 500. The tuned amplifier 400 has its center frequency set so that it converts the reception signal to have a damped oscillation waveform efficiently. Generally, this center frequency is virtually equal to the reciprocal of twice the duration of a radiation light pulse.

The receiving optical fiber 82 has a function of implementing the time-wise separation for the light pulses on the internal light path 3 and external measurement light path 4. Specifically, the receiving optical fiber 82 has its length determined such that a return light pulse reaches the APD 5 after the damped oscillation waveform derived from a reference light pulse coming through the internal light path 3 has attenuated sufficiently.

The polarity detecting circuit 500 detects the polarity (positive or negative) of the output signal of the tuned amplifier 400 based on the transitional (zero-cross) point of the damped oscillation waveform. Any circuit arrangement capable of detecting the polarity of the output signal of the band-pass amplifying means can be used for the circuit 500, and the sampling device may be a bi-leveling circuit which converts the input signal into binary data.

The cumulation means 600 includes a counter array 610 consisting of counters 610(l) through 610(n), and a switching circuit 620 which delivers the output signal of the polarity detecting circuit 500 to each of the counters 610(l)–610(n) at a certain interval. Each counter counts input signals sequentially at least in the time periods when light pulses are generated. The cumulation means 600, which compares to a cumulative memory device, can be any circuit arrangement that can add the output signals of the polarity detecting circuit 500 sequentially, in place of the counter array 610.

The computation means 1000 includes a CPU and associated devices, and it controls the overall electrical circuit including the timing circuit 100 and cumulation means 600. It also has a function as a distance measuring device for measuring the distance to the target 10.

The operation of this embodiment arranged as described above is as follows.

At the beginning, the computation means 1000 initializes the counter array 610 made up of n counters 610(l)–610(n) and the switching circuit 620. Subsequently, it issues the laser diode control signal to the timing circuit 100 to activate the laser diode 1. The timing circuit 100 produces an emission timing signal c from a clock pulse b of the oscillator 200 following the reception of the control signal a from the computation means 1000, with the clock pulse b being delayed at random within the delay range $\Delta T$, and it delivers the produced emission timing signal c to the driver 300. The driver 300 energizes the laser diode 1 in response to the emission timing signal c, and it emits a light pulse.

The tuned amplifier 400 converts a current pulse into a voltage signal having a damped oscillation waveform and amplifies the voltage signal. The voltage signal having the damped oscillation waveform is delivered to the polarity detecting circuit 500, by which the polarity of the signal is detected.

The cumulation means 600 counts output signals of the polarity detecting circuit 500 produced at the rising edge of the clock signal of the oscillator 200 by using counters 610(l)–610(n) of the counter array 610 selected in correspondence to the clock number by the switching circuit 620 which implements the sampling operation. Each counter, when selected, adds one to its contents only in response to the output of a positive result of the polarity detecting circuit 500. The switching circuit 620 operates to select a counter until the clock number reaches n.

At the second and successive light pulse emission, only the switching circuit 620 is initialized, and the counters 610(l)–610(n) operate continuously to add zeros or ones to their contents selectively. On completion of a distance measurement based on the multiple light pulse emission, the computation means 1000 reads out the count values of the counters 610(l)–610(n), and calculates the distance to the target 10 as will be explained later.

Figure 2:
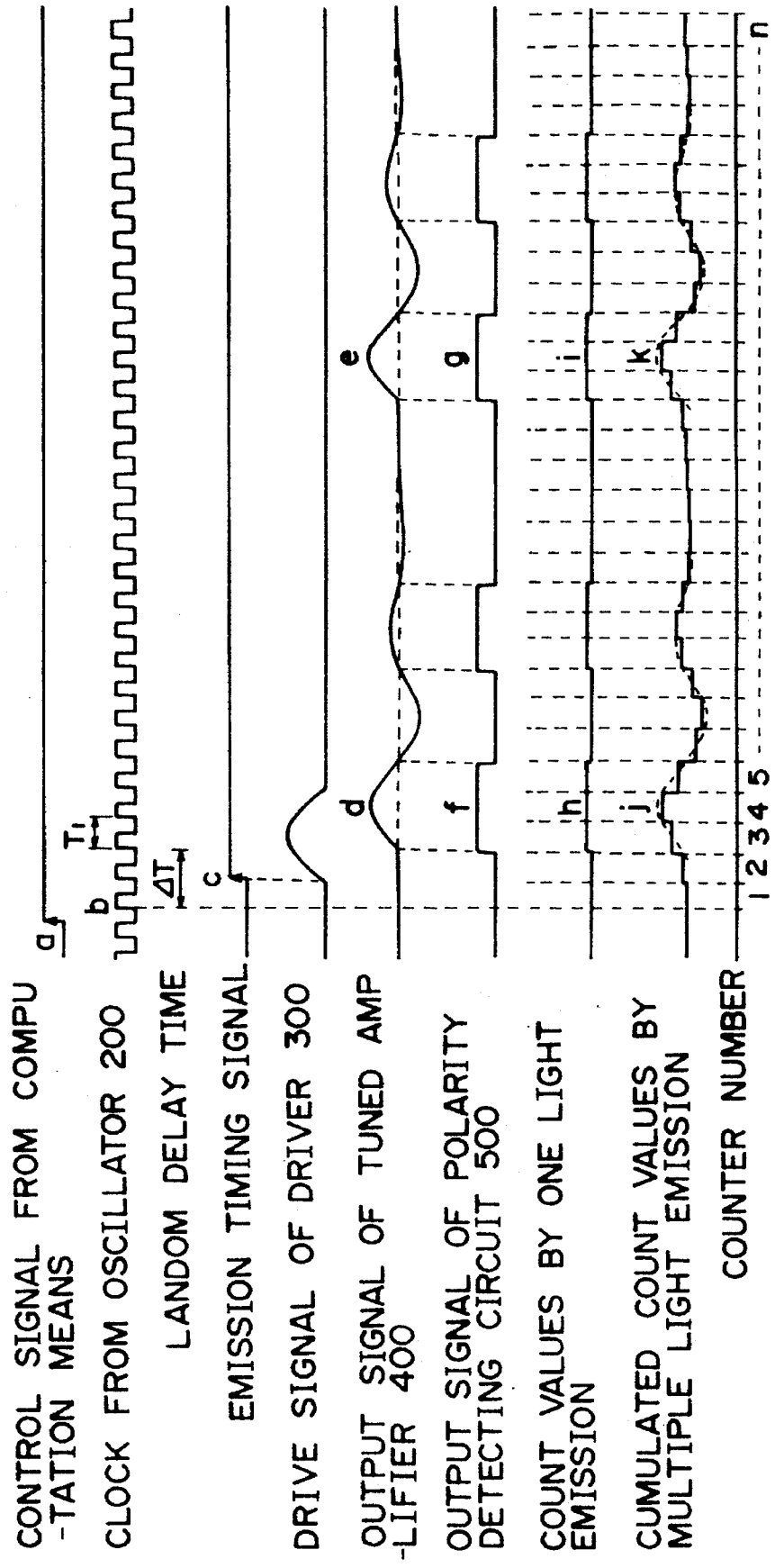
FIG. 2 is a waveform diagram explaining the timing relation between the major signals and the count values of the counter array 610.

The following explains in connection with FIG. 2 the timing relation between the major signals and the count values of the counter array 610.

As mentioned previously, the reception signal derived from the reflected light pulse from the measurement target 10 is so weak that it is dominated by a noise component and cannot undergo direct A/D conversion and data processing. The output signal of the tuned amplifier in FIG. 2 is shown with exaggerated amplitude.

On receiving the control signal "a" from the computation means 1000, the switching circuit 620 delivers the first clock pulse b provided by the oscillator 200 to the counter 610(l) of the counter array 610. The emission timing signal c is sent from the timing circuit 100 to the driver 300, which then supplies power to the laser diode 1.

The oscillator 200 generates clock pulses at an interval $T_1$, and the timing circuit 100 generates emission timing signals for a duration of $\Delta T$.

The tuned amplifier 400 produces an output signal which is derived from the signal d of the reference light pulse coming over the internal light path 3 and the signal e of the return light pulse coming over the external measurement light path 4. The polarity detecting circuit 500 produces binary data that is "1" (f and g) for a positive detection result, or "0" for a negative detection result.

With the count values being plotted on the vertical axis against the count number 1 through n of the counters 610(l)–610(n) on the horizontal axis, the counters corresponding to the timing of the outputs f and g of the polarity detecting circuit 500 have their contents incremented to "1" as shown by h and i as a result of the first light pulse radiation.

Based on the random delay function of the timing circuit 100, the emission timing signal c is generated evenly within the range $\Delta T$ following the clock pulse b supplied by the oscillator 200.

The delay range $\Delta T$ is set as:

$$T_1 \leq \Delta T \tag{2}$$

As a result of multiple light pulse emission, the counters 610(l)–610(n) contain count values that reflect the damped oscillation waveform section j resulting from the reference light pulse coming over the internal light path 3 and the damped oscillation waveform section k resulting from the return light pulse coming over the external measurement light path 4.

The delay range $\Delta T$ compares to the prescribed dither range. The amount of delay is preferably given a dither at each emission of the laser diode 1, or alternatively emission at the same timing may be repeated for a few emission cycles.

There are two methods for the determination of the pulse position based on the count values of the counters 610(l)–610(n) of the counter array 610. The first method is to determine the position of individual pulses, and the second method is to determine the spacing between related pulses.

Method 1:

First, the method 1 measuring the position of individual pulses reflected from the measurement target is explained.

In case this method is adopted, it is desirable for the timing circuit 100 to apply a dither to the emission timing of the light source device and the sampling timing of the sampling device so that the emission timing or sampling timing occurs at a virtually uniform probability within the dither range.

Namely, there is desirably no disparity in the density of occurrence of light emission or sampling among delay times.

Accordingly, continuous count values at portions where the transition of the reception signal takes place across the timing of sampling (i.e., counters have intermediate values between the maximum and minimum values) indicate the amount and direction of a shift of the transitional position of the reception signal caused by the applied dither.

For continuous count values of $N_m$ and $N_{m+1}$ at portions where the transition of the reception signal takes place across sampling timings $S_m$ and $S_{m+1}$ and a number of light emission (number of counting) of N, the transitional timing of the reception signal at a count value of N/2 is expressed as a displacement $\Delta s$ from the sampling timing $S_m$ as follows:

$$\Delta S = k * [(S_{m+1}) - (S_m)]$$

where $$k = \{(N/2) - (N_m)\} / \{(N_{m+1}) - (N_m)\},$$

and k is a real number.

The transitional timing of each reception signal can be evaluated more precisely than the timing of sampling, as shown above.

According to this method, the positions of the reference pulse and measurement pulse are evaluated individually and the light velocity C is multiplied to their time difference T and then the result is halved, and the distance L to the target can be evaluated as follows:

$$L = (T * C)/2$$

If the frequency of sampling timing cannot be made even in the range of dither, in which case the integrated value of the frequency of occurrence appears in the count values, then the sampling timing S, at which the integrated value of the frequency of occurrence becomes half, with the maximum value N of the integrated value of the frequency of occurrence being normalized to one, is evaluated, and the distance can be measured.

Method 2:

Second, the method 2 is explained.

This method is suitable for the case where the difference of time between a return light pulse received from light source by way of the measurement target and a reference light pulse received within the distance meter is evaluated.

In this method, the operation of the timing circuit 100 in applying a dither to the timing of light emission and sampling is identical to the preceding first method.

Count values of the counters 610(l)–610(n) of the counter array 610 represent the damped oscillation waveform (signal reference to reflected pulse signal) of the reception signals having a low S/N ratio.

Accordingly, by calculating the spacing between the waveform section j derived from the reference light pulse received directly within the distance meter (odd-numbered peaks) and the waveform section k derived from the return light pulse from the target (even-numbered peaks) in terms of the counter contents based on the absolute difference method, correlation counting method or the like, the distance to the target can be evaluated.

The reflected light pulse from the target compares to the return measurement light pulse, and the reference light pulse received inside the distance meter compares to the reference light pulse.

During the period when the reception signals are absent, the counter array 610 counts "1" or "0" resulting from background light and noise created in the circuit. In this case, "1" or "0" occur at the same probability due to the random phenomena, and the number of data is estimated for a sufficiently large number of counting as:

(number of data during the absence of (3)

reception signals) = (number of counting)*0.5

In the presence of a return pulse signal by way of the external measurement light path 4, when the damped oscillation waveform is positive, the number of data is estimated as:

(number of data in the presence of reception (4)

signal) > (number of counting)*0.5

In the presence of a return pulse signal by way of the external measurement light path 4, when the damped oscillation waveform is negative, and the number of data is estimated as:

(number of data in the presence of reception (5)

signal) < (number of counting)*0.5

Accordingly, by choosing a sufficiently large number of counting, a return light pulse coming over the external measurement light path 4 can be recognized as a reception signal even if it is so weak that it is dominated by background light and noise created in the circuit.

As an alternative manner of dealing with data during the absence of reception signals, count values resulting from background light and internal noise when the laser diode 1 is kept inactive are memorized in advance and used for the reference state of data.

This embodiment is immune to a poor S/N ratio of the reception signals since the tuned amplifier 400 cuts off excessive frequency components. The damped oscillation waveform is the a.c. component extracted from a reception signal, and its zero-cross point represents the centroid of a reception pulse. Accordingly, the output signal of the polarity detecting circuit 500 does not depend on the quantity of light of the reception pulse, and accurate and reliable positional information can be obtained.

The dither of radiation light pulse with respect to the clock pulses of the oscillator 200 based on the random delay function of the timing circuit 100 is accomplished by generating the output waveform of the polarity detecting circuit 500 virtually evenly at random within the dither width $\Delta T$ with respect to the clock signal of the oscillator 200. The dispersion of data due to the passing of the zero-cross point of the damped oscillation waveform (transitional point of the reception signal) over a clock pulse of the oscillator 200 caused by the dither corresponds to the phase shift of the zero-cross of damped oscillation waveform with respect to the clock signal of the oscillator 200.

This results in the interpolation of the zero-cross point of the damped oscillation waveform among clock pulses of the oscillator 200, and it diminishes the sampling error attributable to the oscillator 200 and enables high-accuracy distance measurement.

The conversion of the reception signal to have a damped oscillation waveform by the tuned amplifier 400 disperses the pulse waveform information on the time axis in the period of tuned frequency, causing a single light pulse to generate multiple zero-cross points, and accordingly the effect of interpolation can be exerted several times by each light pulse radiation.

By making the zero-cross interval of the damped oscillation waveform unequal to a multiple of the interval $T_1$ of clock pulses of the oscillator 200, the phase shift of zero-cross point with respect to the clock interval $T_1$ varies, and it can alleviate the unevenness of data dispersion.

In case the delay range $\Delta T$ meets the condition of formula (2), all zero-cross points originating from one light pulse due to dither pass over clock pulses of the oscillator 200, and the best effect of interpolation can be attained.

If at least one transition out of multiple transitions of the reception signal (zero-cross points in the case of a damped oscillation waveform) passes over a clock pulse of the oscillator 200, it yields the effect of interpolation, enabling the setting of a much smaller $\Delta T$.

The range $\Delta T$ of dither between the reception signal (damped oscillation waveform) and clock signal necessary for at least one transition of reception signal (zero-cross point in the case of a damped oscillation waveform) to pass a rising edge (sampling timing) of clock pulse of the oscillator 200 is given by the following formula (6).

For an interval $T_1$ of sampling timing, a number of transitions in question Ne of the reception signal resulting from one light radiation, a transitional interval $T_3$ of the reception signal, and the difference $T_2$ between $T_3$ and $T_1$, the number of sampling timing Nc within the range that covers the transitions in question of the reception signal is given as follows:

$Nc=[T_3(Ne-1)/T_1]+1$ where the brackets [ ] stand for the Gaussian symbol, meaning that for a real number x and integer n, if $n \leq x < n+1$, then [x]=n.

The sampling timing, when shown within one transitional period, within the range that covers the transitions in question of the reception signal is given, for the case of k=0 through Nc, as follows:

$T_2*k-[T_2*k/T_3]*T_3$

The dither range $\Delta T$ is set to have a relation in terms of intervals $\Delta T_0$ through $\Delta T_{Nc}$, which are formed when the difference between the transitional timing resulting from one light radiation and the sampling timing is shown in one transitional interval, as follows:

$\max\{\Delta T_0, \ldots, \Delta T_{Nc}\} \leq \Delta T$ (6)

Accordingly, at least one transition (zero-crossing) of the reception signal passes a rising edge (sampling timing) of the clock ! pulse of the Oscillator 200, and the resolution is improved at the portion of crossing.

The relation between the sampling timing within the range that covers the transitions in question of the reception signal, when shown in one transitional period, and the intervals $\Delta T_0$ through $\Delta T_{Nc}$ formed by the timing, when shown in one transitional interval, will be explained.

Figure 3:
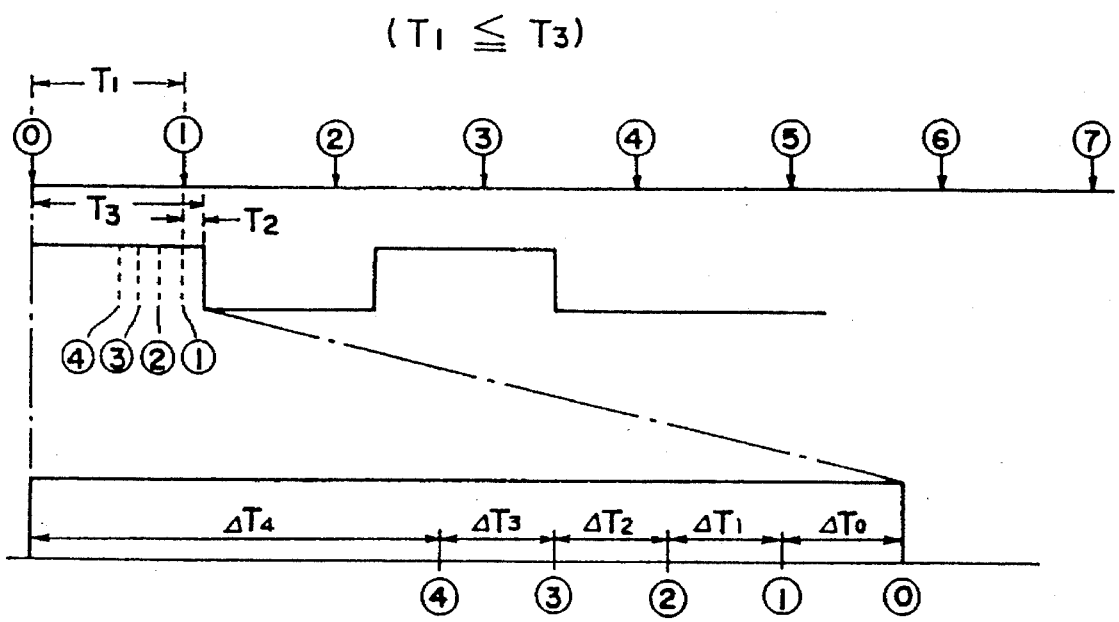
FIGS. 3a and 3b are diagrams explaining the relation among $\Delta T_0$ through $\Delta T_{NC}$ in the case where the sampling interval $T_1$ is shorter than or equal to the duration $T_3$ of the reception signal.
Figure 3B:
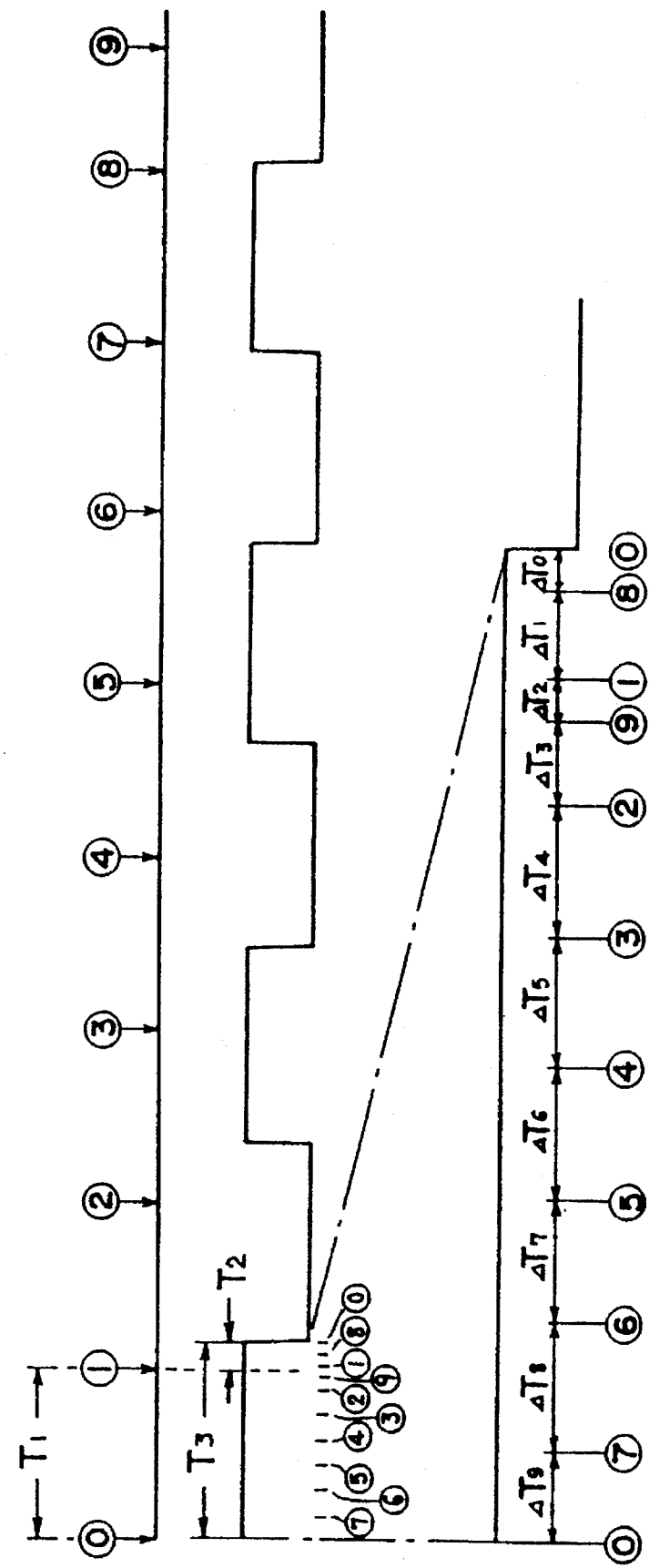

FIGS. 3a and 3b show the case where the sampling timing interval $T_1$ is shorter than or equal to the transitional interval $T_3$ of the reception signal. FIG. 3a shows the case where the difference between the transitional timing of reception signal and the sampling timing is smaller than or equal to the transitional timing interval $T_3$, and FIG. 3b shows the case where the difference between the transitional timing of reception signal and the sampling timing is greater than the transitional timing interval $T_3$.

Figure 4A:
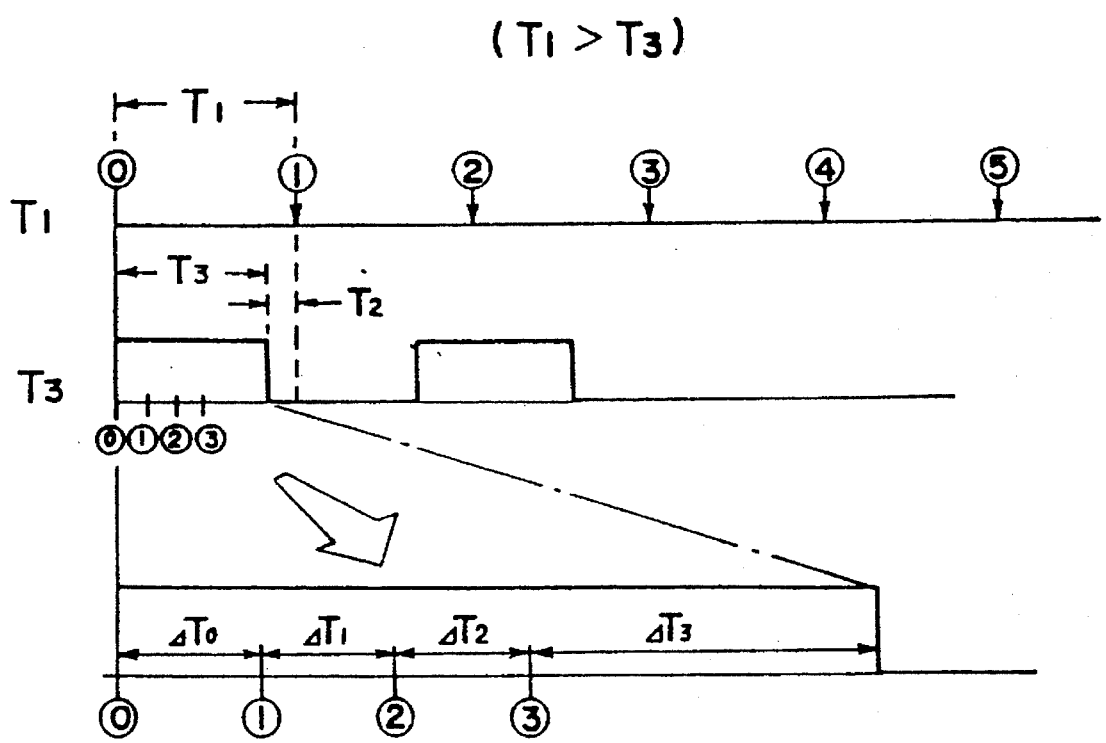
FIGS. 4a and 4b are diagrams explaining the relation among $\Delta T_0$ through $\Delta T_{NC}$ in the case where the sampling interval $T_1$ is longer than the duration $T_3$ of the reception signal.
Figure 4B:
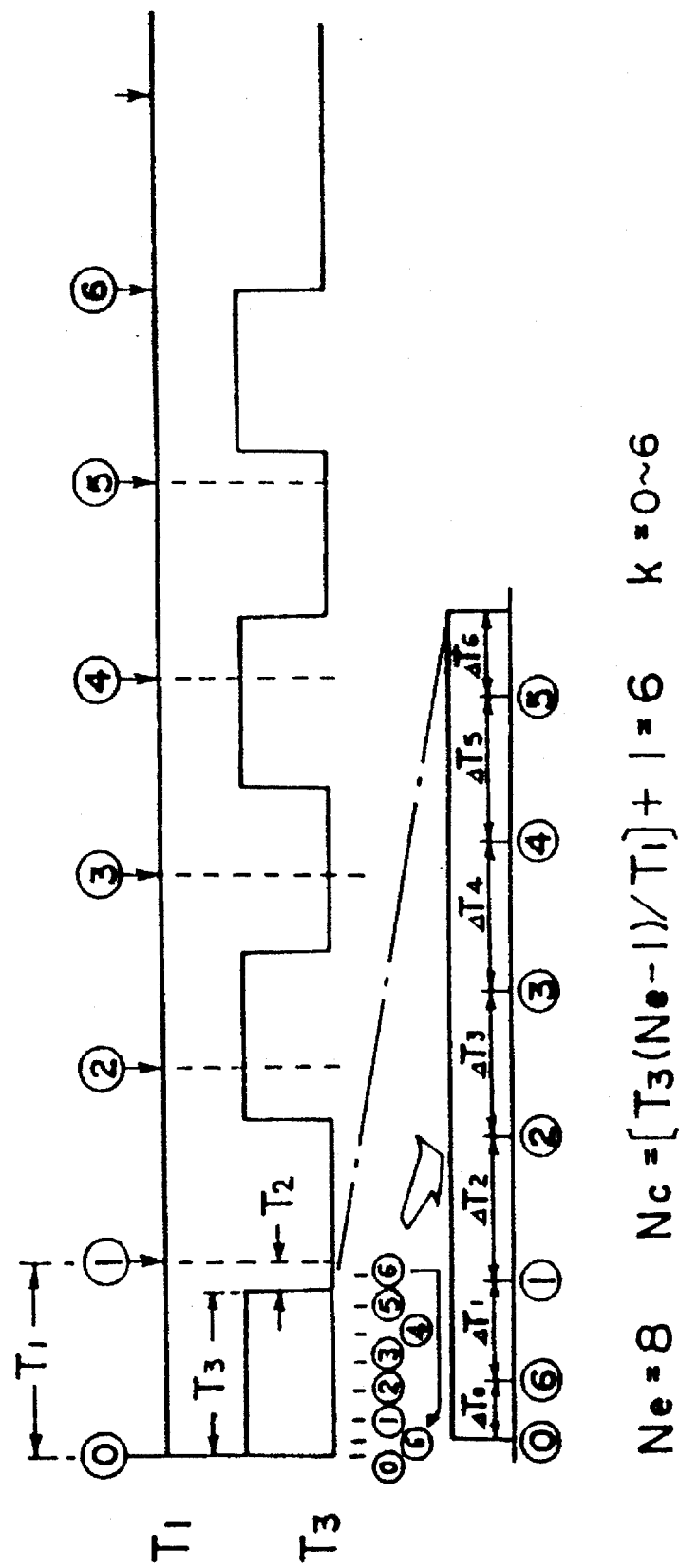

FIGS. 4a and 4b show the case where the sampling timing interval $T_1$ is greater than the interval $T_3$ of reception signal.

FIG. 4a shows the case where the difference between the transitional timing of reception signal and the sampling timing is smaller than or equal to the transitional timing interval $T_3$, and FIG. 4b shows the case where the difference between the transitional timing of reception signal and the sampling timing is greater than the transitional timing interval $T_3$.

In these figures, a string of circled numbers on the first stage indicate the sampling timing, the second stage shows the reception signal that includes transitions in question and the sampling timing in the first transitional period within the range that covers the transitions in question of the reception signal, and the third stage shows by enlargement the relation of sampling timing. Values of Ne, Nc and k are given in these figures.

The distortion of reception pulse appears only as a small variation in the centroid position in this embodiment, which is included in both of the damped oscillation waveform sections j and k. Therefore it is cancelled out during the distance calculation process and does not cause a cyclic linearity error of the clock period.

Figure 5A:
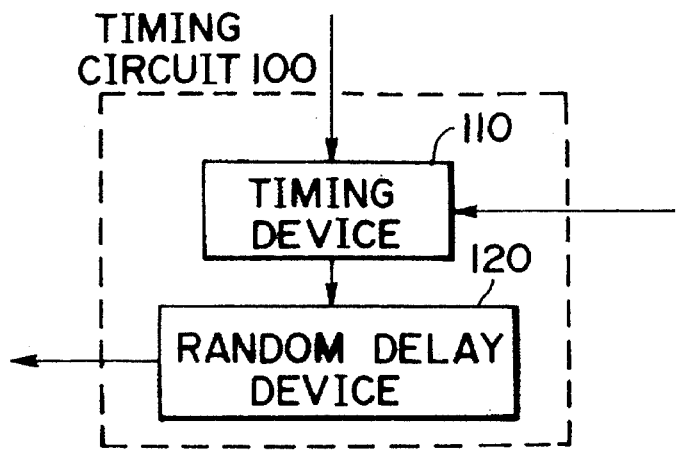
FIG. 5a is a diagram used to explain the timing circuit 100 of this embodiment.

Next, the timing circuit 100 will be explained with reference to FIGS. 5a–5c. The timing circuit 100 shown in FIG. 5a is to carry out the above-mentioned first method. A timing device 110 operates on a random delay device 120 to delay at random the timing that is originally determined by the clock signal of the oscillator 200 and emission control signal from the computation means 1000 and deliver a resulting emission timing signal c to the driver 300.

Figure 5B:
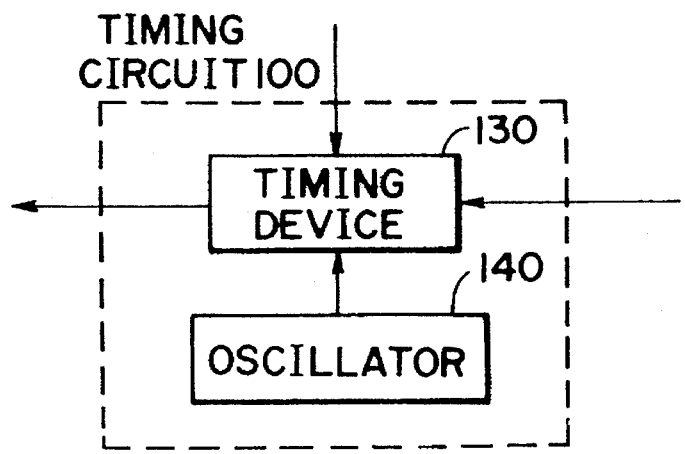
FIG. 5b is a diagram used to explain a first variant of the timing circuit 100.

FIG. 5b shows a first variant arrangement of the timing circuit 100. The timing circuit 100 includes its own oscillator 140 having a frequency set unequal to a multiple of the frequency of the oscillator 200. A timing device 130 detects the rising edge of the output of oscillator 140 following the timing determined by the clock signal of the oscillator 200 and emission control signal from the computation means 1000, and deliver a resulting emission timing signal to the driver 300.

Figure 5C:
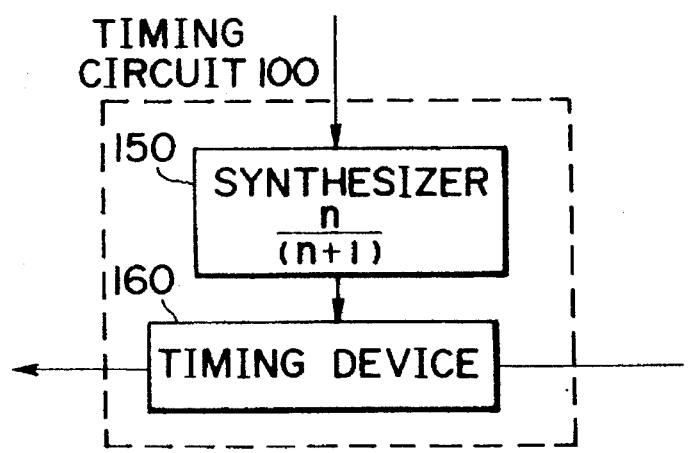
FIG. 5c is a diagram used to explain a second variant of the timing circuit 100.

FIG. 5c shows a second variant arrangement of the timing circuit 100. It includes a synthesizer 150, which produces a frequency that is n/(n+1) times the frequency of the oscillator 200. A timing device 160 determines a timing based on the frequency produced by the synthesizer 150 and the emission control signals from the computation means 1000, and delivers a resulting emission timing signal to the driver 300.

Although the dither produced in the embodiment arranged as described above is not completely random but produced based on certain regularity, it is possible to obtain even data dispersion by setting the number of light emission to be a multiple of n.

Although in the foregoing embodiment the reception signal is converted into a damped oscillation waveform by the tuned amplifier 400 and then sampled, the present invention may be arranged to sample the reception signal directly, and in this case it can retrieve the signal waveform even from a signal having a poor S/N ratio, enabling high-resolution distance measurement.

It is of course possible for the present invention to count all transitions of the damped oscillation waveform.

Figure 6:
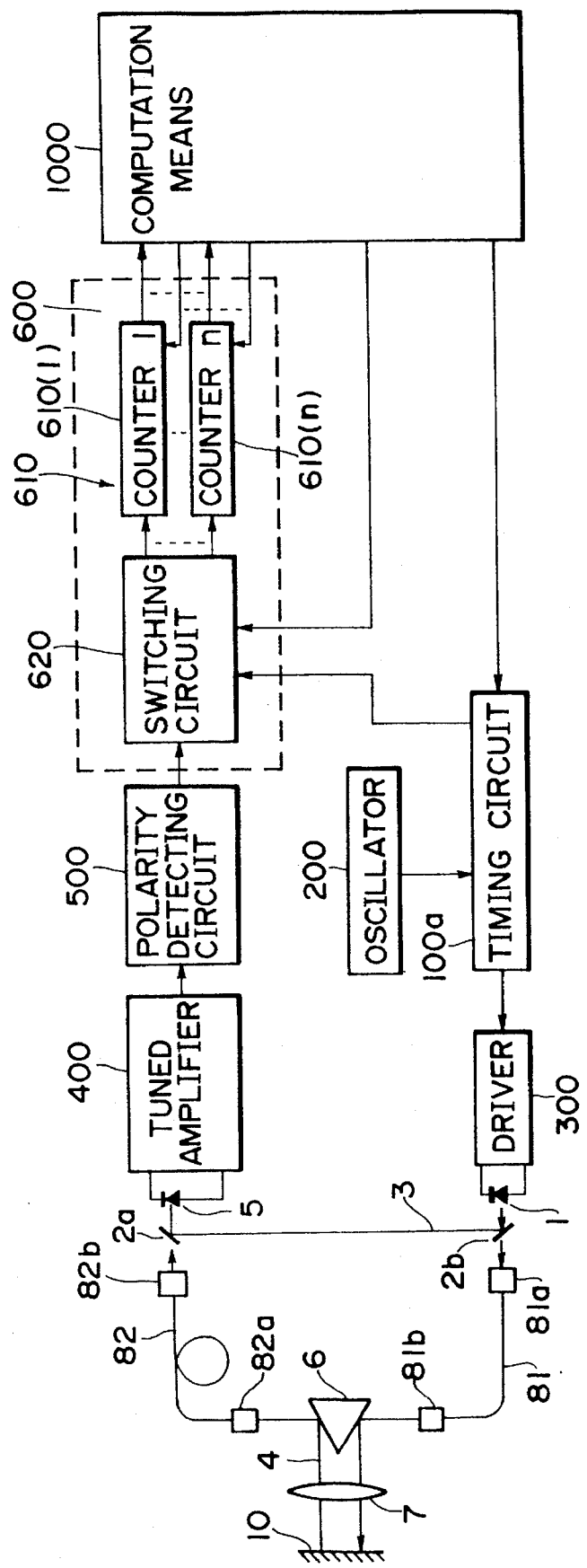
FIG. 6 is a block diagram of the light-wave distance meter based on light pulses based on a first variant embodiment of this invention.

Although in the foregoing embodiment a dither is applied to the emission timing (transition of reception signal) with respect to the sampling timing, the dither may be applied to the sampling timing with respect to the emission timing (transition of reception signal) as shown in FIG. 6 as a first variant embodiment of this invention.

The distance meter shown in FIG. 6 is different from the preceding embodiment of FIG. 1 in that a timing circuit 100a applies a dither to clock pulses fed to the switching circuit 620 with respect to the emission signal.

Figure 7:
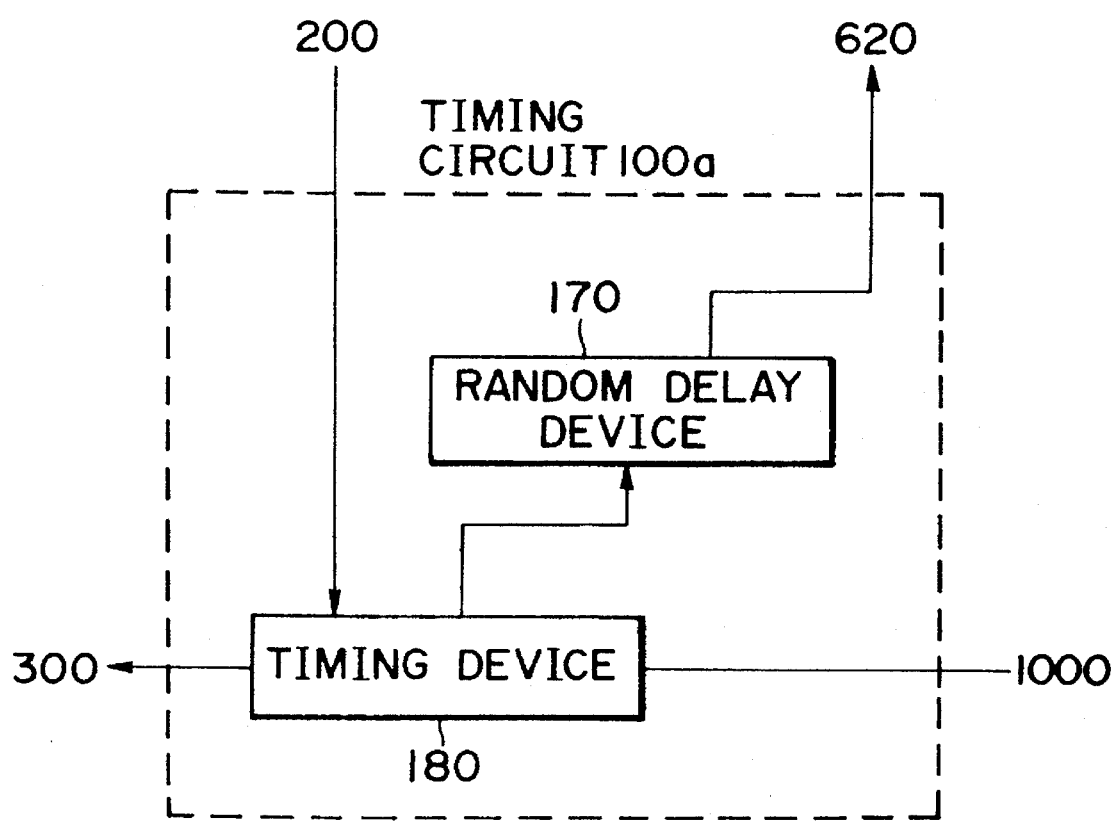
FIG. 7 is a diagram used to explain the timing circuit 100a based on the first variant embodiment.

The timing circuit 100a includes a random delay device 170 and a timing device 180 as shown in FIG. 7, and it issues a emission timing signal to the driver 300 and also supplies clock pulses, with a dither being applied thereto in a prescribed range, to the switching circuit 620 in accordance with the signals from oscillator 200 and computation means 1000.

Next, a second variant embodiment of this invention will be explained. In contrast to the preceding embodiments in which the counter array 610 needs to have a very large number of counters, the second variant embodiment is intended to reduce the number of counters based on the fact that with the same data being introduced to multiple counter arrays 610 of different lengths, the positional relation on the counter arrays of the waveform derived from the reception signal varies depending on the distance to the measurement target 10.

Figure 8:
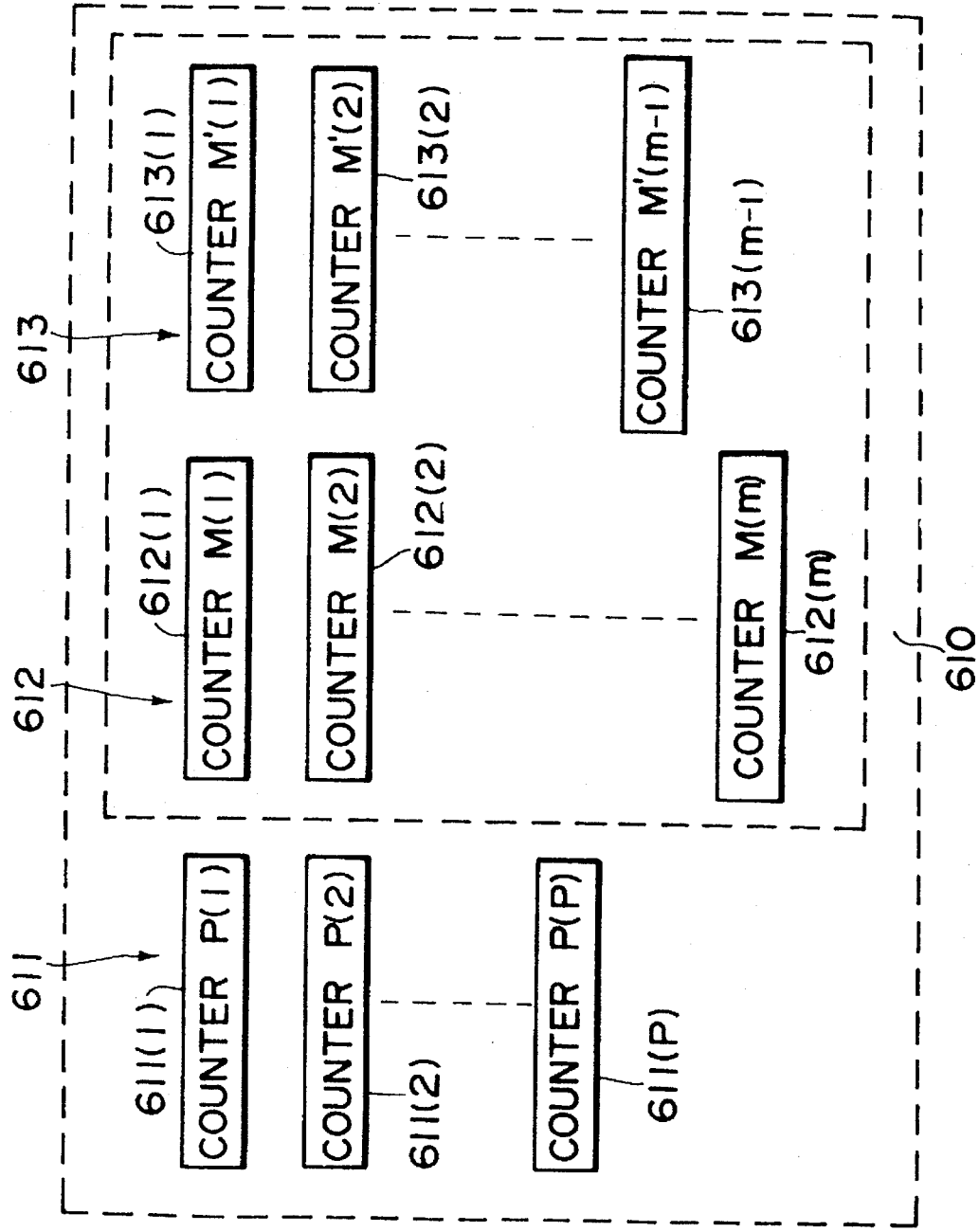
FIG. 8 is a diagram used to explain a variant of the counter array 610 based on a second variant embodiment of this invention.

Specifically, the counter arrays 610 consist of three counter arrays 611, 612 and 613 as shown in FIG. 8. The counter array 611 includes counters 611(*l*) through 611(*p*) of p in number, the counter array 612 includes counters 612(*l*) through 612(*m*) of m in number, and the counter array 613 includes counters 613(*l*) through 613(m–1) of m–1 in number.

Figure 9B:
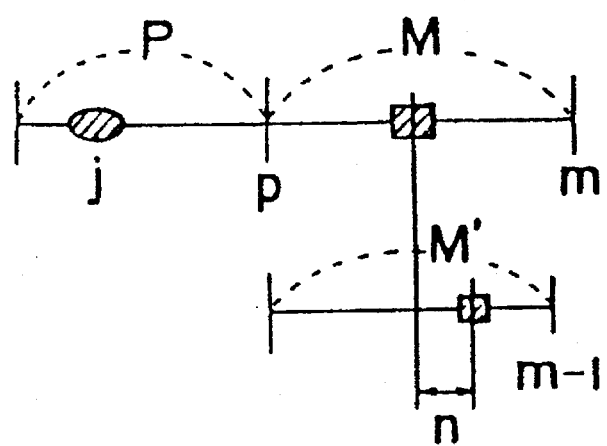

Outputs of p in number provided by the polarity detecting circuit 500 since the light pulse emission are introduced to the counter array 611, and the (p+1)th and successive outputs are introduced concurrently to the counter array 612 which cycles in m inputs and the counter array 613 which cycles in m–1 inputs, as shown in FIGS. 9a and 9b. Accordingly, the first counter of the counter array 612 counts the (p+1)th, (p+m+1)th, (p+2m+1)th data and so on, and the first counter of the counter array 613 counts the (p+1)th, (p+(m–1)+1)th, (p+2(m–1)+1)th data and so on. All counter arrays 611, 612 and 613 have sufficient capacities to cover the damped oscillation waveform, and particularly the counter array 611 has a capacity only to cover the reference light pulse received over the internal light path 3.

For a distance L to the measurement target 10, when a pulse signal d and reception signal e appear at the output of the tuned amplifier 400 and corresponding rectangular waveform sections f and g are produced at the output of the polarity detecting circuit 500, the counter arrays 612 and 613 finally store sums of inputs during both the presence and absence of the reception signals. During the absence of the reception signals, the tuned amplifier 400 produces positive and negative results at the same probability, causing a noise component to be averaged off and thus become harmless to the significant data of reception signals.

Since the counter arrays 612 and 613 are different in size by one counter, they introduce a reception signal at different counter numbers as the distance L to the target 10 increases. If the counter arrays 612 and 613 have a displacement of input counters of n, there are m*n clock pulses of the oscillator 200 between the count values of the counter arrays 611 and 612. For a distance $L_2$ equivalent to the m*n clock pulses and a fine distance $L_1$ provided by the counter arrays 611 and 612, the distance L to the target 10 is given as follows:

$$L=L_1+L_2 \qquad (7)$$

The maximum distance Lmax which can be treated by the counter arrays 612 and 613 is determined from the greatest common measure of m and m−1 as follows:

$$Lmax=(m-1)*m=m^2-m \qquad (8)$$

In a specific case of m=100, the Lmax is 9900.

Namely, a counter array made up of 9900 counters can be replaced with the combination of a counter array made up of 100 counters and a counter array made up of 99 counters, and the number of counters can be reduced significantly. Similarly, the waveform detection and distance calculation can be carried out by using two counter arrays of 100 counters and a counter array of 99 counters, in place of the counter array of 9900 counters, and the distance calculation time can be reduced significantly.

Although the foregoing second variant embodiment arranges the cumulation means 600 with two counter arrays, it may be arranged with three or more counter arrays so that the measurable distance is extended.

Although the foregoing embodiments use counters for the cumulation means 600, the same cumulative process can be carried out by the combination of the computation means 1000 and memory means.

Next, another cumulation means 600 for the third variant embodiment of this invention is explained with reference to FIG. 12.

The cumulation means 600 consists of a n-bit serial-in-parallel-out (SIPO) shift register 630, a n-bit latch 635, a 1/n frequency demultiplier 631, an address counter 632, adders 633(*l*)–633(*n*) of n in number, and registers 634(*l*)–634(*n*) of n in number.

In operation, the computation means 1000 initializes the address counter 632 and registers 634(*l*)–634(*n*), and thereafter commands the first light pulse emission. In the cumulation means 600, the outputs of the polarity detecting circuit 500 are fed to the shift register 630 in response to the clock signal of the oscillator 200. The shift register 630 has its n-bit outputs held by the latch 635 and the address counter 632 is incremented in response to the output of the frequency demultiplier 631 which demultiplies the clock of the oscillator 200 by 1/n.

The adders 633(*l*)–633(*n*) and registers 634(*l*)–634(*n*), which compare to the cumulative memory device, operate to add n-bit data in the latch 635 to the stored data. The cumulative memory terminates the operation when the number of clock pulses supplied by the oscillator 200 has reached a predetermined number N.

The number n of the stages of the shift register 630 and latch 635 and the operational factor of the frequency demultiplier 631 is chosen such that the cumulative memory operation by the adders 633 and registers 634 completes in the n-clock period of the oscillator 200.

At the second and successive light pulse emission, only the address counter 632 is initialized, and outputs of the sampling device 500 are fed to the shift register 630 and summed by the adders 633 and registers 634. A distance measuring operation is completed after multiple light pulse radiation. The p-th register among the registers 634(*l*)–634(*n*) stores the cumulated data at the p-th, (n+p)th, (2n+p)th clock pulses and so on, and the computation means 1000 rearranges data read out of the registers 634, thereby obtaining the same data as j and k shown in FIG. 2 , and the distance to the target 10 can be calculated.

The adders 633 and registers 634 compare to an adding device and memory device, respectively.

Next, another cumulation means 600 for the fourth variant embodiment of this invention will be explained with reference to FIG. 13.

The cumulation means 600 consists of a first 8-bit shift register 640 of serial-in-parallel-out (SIPO) type, a 8-bit latch 650, a first ⅛ frequency demultiplier 641, a 1/q frequency demultiplier 642, a first memory 643, a first address counter 644, a second ⅛ frequency demultiplier 645, a second shift register 646 of parallel-in-serial-out (PISO) type, a second address counter 647, an adder 648, and a second memory 649.

In operation, the computation means 1000 initializes the first and second address counter 644 and 647 and the second memory 649, hand thereafter commands the first light pulse emission. In the cumulation means 600, the outputs of the polarity detecting circuit 500 are fed to the first shift register 640 in response to the clock signal of the oscillator 200.

The shift register 640 has its 8-bit outputs held by the latch 650 and the first address counter 644 is incremented in response to the output of the first ⅛ frequency demultiplier 641 which demultiplies the clock of the oscillator 200, and the outputs of the latch 650 are stored in the first memory 643. Namely, data for eight clock pulses of the oscillator 200 is stored in a 1-word (8 bits) area of the first memory 643.

When the number of clock pulses supplied by the oscillator 200 has reached a predetermined number N, the data holding operation by the shift register 640, latch 650, first ⅛ frequency demultiplier 641, first address counter 644 and first memory 643 terminates, and the first address counter 644 is initialized again.

The clock signal of the oscillator 200 is demultiplied by 1/q by the 1/q frequency demultiplier 642, and resulting pulses are fed to the second ⅛ frequency demultiplier 645 and second address counter 647. The first address counter 644 is incremented in response to the output of the second ⅛ frequency demultiplier 645, causing the first memory 643 to release 1-word (8 bits) data to the PISO shift register 646. Consequently, the shift register 646 holds data from the first memory 643 in response to the output of the second ⅛ frequency demultiplier 645.

The first memory 643 has its output data fed serially through the SIPO shift register 646 to the adder 648. The cumulative memory device formed of the adder 648 and second memory 649 adds the output of the second shift register 646 to data in the second memory 649 at the address determined by the second address counter 647 which is incremented by the output of the 1/q frequency demultiplier 642.

These operations are carried out repeatedly for N bit data held in the first memory 643.

At the second and successive light pulse emission, only the first and second address counters 644 and 647 are initialized, and the data holding operation of the first memory 643 and the cumulative memory operation by the adder 648 and second memory 649 take place iteratively. A distance measuring operation is completed after multiple light pulse emission. The computation means 1000 reads out the cumulated values from the second memory 649, thereby obtaining the same data as j and k shown in FIG. 2, and calculates the distance to the target 10.

The data holding operation of the first memory 643 is completed in a 8-clock period of the oscillator 200, and the data cumulative memory operation by the adder 648 and second memory 649 is completed in a 1-clock period of the 1/q frequency demultiplier 642.

Although in this variant embodiment the first and second frequency demultipliers 641 and 645 have an operational factor of ⅛, the first SIPO shift registers 640 and the second PISO shift registers 646 and the latch 650 have a 8-bit length and the first memory 643 has a 8-bit word length, the value 8 may be varied depending on the time lengths expended for the data holding operation by the first memory 643 and the cumulative memory operation by the adder 648 and second memory 649.

The first memory 643 compares to a first memory device, and the second memory 649 compares to a second memory device.

According to the present invention as described above, the light source device generates light pulses at a prescribed interval, the light radiation means radiates the light pulses to a target of measurement, the light reception device receives reflected light pulses from the target and converts the light pulses into reception signals, the sampling device samples the reception signals at a prescribed interval, the timing device applies a dither of a prescribed range to the emission timing of the light source device and sampling timing of the sampling device, the cumulative memory device stores the outputs of the sampling device cumulatively at the prescribed interval, and the distance measuring device calculates the distance to the target based on the stored values of the cumulative memory device. Based on the sampling for a reflected light pulse with the dither being applied, it becomes possible to determine the pulse position at a resolution higher than the sampling timing.

The inventive distance meter detects the centroid position of the reception signals accurately in a simple arrangement without using a fast A/D converter. It can positively distinguish a weak reception pulse in long-distance measurement from a noise component, which can extend the measurable distance without increasing the laser output power beyond the safety level.

The timing device of the inventive distance meter may be modified to provide a difference in either the emission timing of the light emission device or the sampling timing of the sampling device, at random within a certain range.

According to the present invention, the light source device generates light pulses at a prescribed interval, the light radiation means radiates the light pulses to a target of measurement, the light reception device receives reflected light pulses from the target and reference light pulses that do not go out of the distance meter and converts the light pulses into reception signals, the sampling device samples these reception signals at a prescribed interval, the timing device applies a dither of a prescribed range to the emission timing of the light source device and sampling timing of the sampling device at each reception of the return measurement light pulse, the cumulative memory device stores the outputs of the sampling device cumulatively at the prescribed interval, and the distance measuring device calculates the distance to the target based on the stored values derived from the reflected light pulse and reference light pulse in the cumulative memory device. Based on data of the reflected light pulse and reference light pulse sampled at the timing, with the dither being applied, it becomes possible to determine the reflected light pulse position with respect to the reference pulse position at a resolution higher than the sampling timing.

Accordingly, the sampling error attributable to the oscillator can be diminished and high-accuracy distance measurement can be conducted.

It is also possible for the inventive distance measuring device to calculate the distance to the target by calculating the correlation between the cumulated values derived from the reflected light pulse and the cumulated values derived from the reference light pulse stored in the cumulative memory device.

It is also possible for the inventive light reception device to include a band-pass amplifying means which delivers its output to the sampling device.

By adopting a tuned amplifier for the bandpass amplifying means and counters for the cumulation means, the polarity detection means produces binary data, enabling faster operation by the counters as compared with an A/D converter and simultaneous operation of data acquisition and cumulation, and consequently distance measurement can be sped up.

It is also possible for the inventive timing device to apply a dither to the emission timing with respect to the sampling timing.

It is also possible for the inventive timing device to apply a dither to the sampling timing with respect to the emission timing.

It is also possible for the inventive sampling device to be a bi-leveling device which converts the input signal into binary data.

The inventive cumulation means adopt multiple counter arrays having different lengths and the output signal of the polarity detecting circuit is added to multiple counter arrays concurrently, and consequently the total number of counters can be reduced significantly.

The present invention includes a bi-leveling device for forming the output signal of the band-pass amplifying means into binary data, a cumulative memory device for cumulating the binary output data of the bi-leveling device at each light pulse generation by the light source device, and a distance measuring device for calculating the distance to the target of measurement. Accordingly, the data cumulating operation associated with each light emission can be conducted during the quiescent period, which is a characteristic of the pulse laser diode, between consecutive light pulse emissions, and consequently the time needed for processing an increased amount of data due to the enhancement of resolution and the extension of measurable distance can be minimized and eventually the distance calculation time can be minimized. The inventive distance meter uses memories of minimal capacity and does not use a fast expensive A/D converter. It detects the centroid position of the reception signals accurately based on a simple arrangement, and the linearity error does not depend on the characteristics of the pulse laser diode.

We claim:

1. A distance meter comprising:
   a light source device for emitting light pulses at nominally equal emission time intervals;
   a light radiator device optically coupled to the light source device for radiating the emitted light pulses to a reflective measurement target at a distance to be determined;
   a light receiver device configured and disposed for receiving light pulses reflected from the measurement target and converting the reflected light pulses into reception signals;

a data former device operatively coupled to the light receiver device for forming, from the reception signals, data representing frequency of occurrence of the reflected light pulses at nominally equal sampling time intervals, the data former device comprising a sampler device for sampling into the reception signals to produce sampled values and a cumulative memory device for cumulating the sampled values and storing the cumulated values as the frequency of occurrence of the reflected light pulses;

a timer device operatively coupled to the light source device and/or the data former device for applying a dither within a prescribed dither range to the emission time intervals and/or the sampling time intervals; and a distance calculator device operatively coupled to the data former device for using the data to determine the distance to the measurement target.

2. The distance meter according to claim 1, wherein the sampler device is for producing the sampled values in binary form.

3. The distance meter according to claim 1 or 2 wherein the timer device is for applying the dither to the emission time intervals and the sampling time intervals with uniform probability in the dither range.

4. A distance meter comprising:

a light source device for emitting light pulses at nominally equal emission time intervals, with each light pulse comprising a measurement light pulse and a reference light pulse;

a light radiator device optically coupled to the light source device for radiating the measurement light pulses to a reflective measurement target at a distance to be determined;

a light receiver device configured and disposed for receiving light pulses reflected from the measurement target, receiving the reference light pulses, and converting the received light pulses into reception signals;

a data, former device operatively coupled to the light receiver device for forming, from the reception signals, data representing frequency of occurrence of the received light pulses at nominally equal sampling time intervals, the data former device comprising a sampler device for sampling the reception signals to produce sampled values and a cumulative memory devices for cumulating the sampled values and storing the cumulated values as the frequency of occurrence of the reflected light pulses;

a timer device operatively coupled to the light source device and/or the data former device for applying a dither within a prescribed dither range to the emission time intervals and/or the sampling time intervals; and a distance calculator device operatively coupled to the data former device for using he data to determine the distance to the measurement target.

5. The distance meter according to claim 4, wherein the sampler device is for sampling the reception signals to produce the sampled values in binary form.

6. The distance meter according to claim 2 or 5, wherein the cumulative memory device comprises:

an adder device for adding, at successive receptions of binary data from the sampler device, the received binary data to binary data that have been previously received and cumulated; and a memory store for storing a resulting cumulated final value.

7. The distance meter according to claim 6, wherein the cumulative memory device comprises:

a first memory store for temporarily storing part of the sampled values from an individual light pulse emission of the light source;

a second memory store for storing cumulated values; and an adder device for adding a value stored in the first memory device to a previously stored cumulated value in the second memory store.

8. The distance meter according to claim 6, wherein the cumulative memory device comprises:

a first memory store for temporarily storing all of the sampled values from an individual light pulse emission of the light source;

a second memory store for storing cumulated values; and an adder device for adding a value stored in the first memory device to a previously stored cumulated value in the second memory store.

9. The distance meter according to claim 4, wherein the distance calculator device is instructed for determining a correlation between cumulated values derived from the reflected light pulses and cumulated values derived from the reference light pulses.

10. The distance meter according to claim 1 or 4, wherein the light receiver device comprises a band-pass amplifier operatively coupled to the sampler device.

11. The distance meter according to claim 10, wherein the band-pass amplifier comprises a tuned amplifier.

12. The distance meter according to claim 1 or 4, wherein the timer device is for applying the dither to the emission time intervals as a function of the sampling time intervals.

13. The distance meter according to claim 1 or 4, wherein the timer device is for applying the dither to the sampling time intervals as a function of the emission time intervals.

14. The distance meter according to claim 1 or 4, wherein the sampler device is for producing the sampled values in binary form.

15. The distance meter according to claim 1 or 4, wherein the dither range, $\Delta T$, is prescribed in relation to the sampling time interval, $T_1$, such that $\Delta T \geq T_1$.

16. The distance meter according to claim 1 or 4, wherein the dither range, $\Delta T$, is prescribed in relation to the sampling time interval, $T_1$, a number of transitions Ne of the reception signal resulting from one light pulse, a transition time interval $T_3$ of the reception signal, a difference $T_2$ between the sampling time interval $T_1$ and the transition time interval $T_3$, and time intervals $\Delta T_0, \ldots, \Delta T_{Nc}$ formed when the difference between a transition time and a sampling time lies in one transition time interval such that $\max\{\Delta T_0, \ldots, \Delta T_{Nc}\} \leq \Delta T$ where $Nc=[T_3(Ne-1)/T_1]+1$ and the sampling time is $$\Delta T_2 * k - [\Delta T_2 * k / T_3] * T_3$$

where k takes any value from 0 to Nc, and brackets [ ] stand for the Gaussian symbol so that, for a real number x and an integer n, if $n \leq x < n+1$, then $[x]=n$.

* * * * *

UNITED STATES PATENT AND TRADEMARK OFFICE
CERTIFICATE OF CORRECTION

PATENT NO.   : 5,619,317

DATED        : April 8, 1997

INVENTOR(S) : Ohishi et al.

Figure 10:
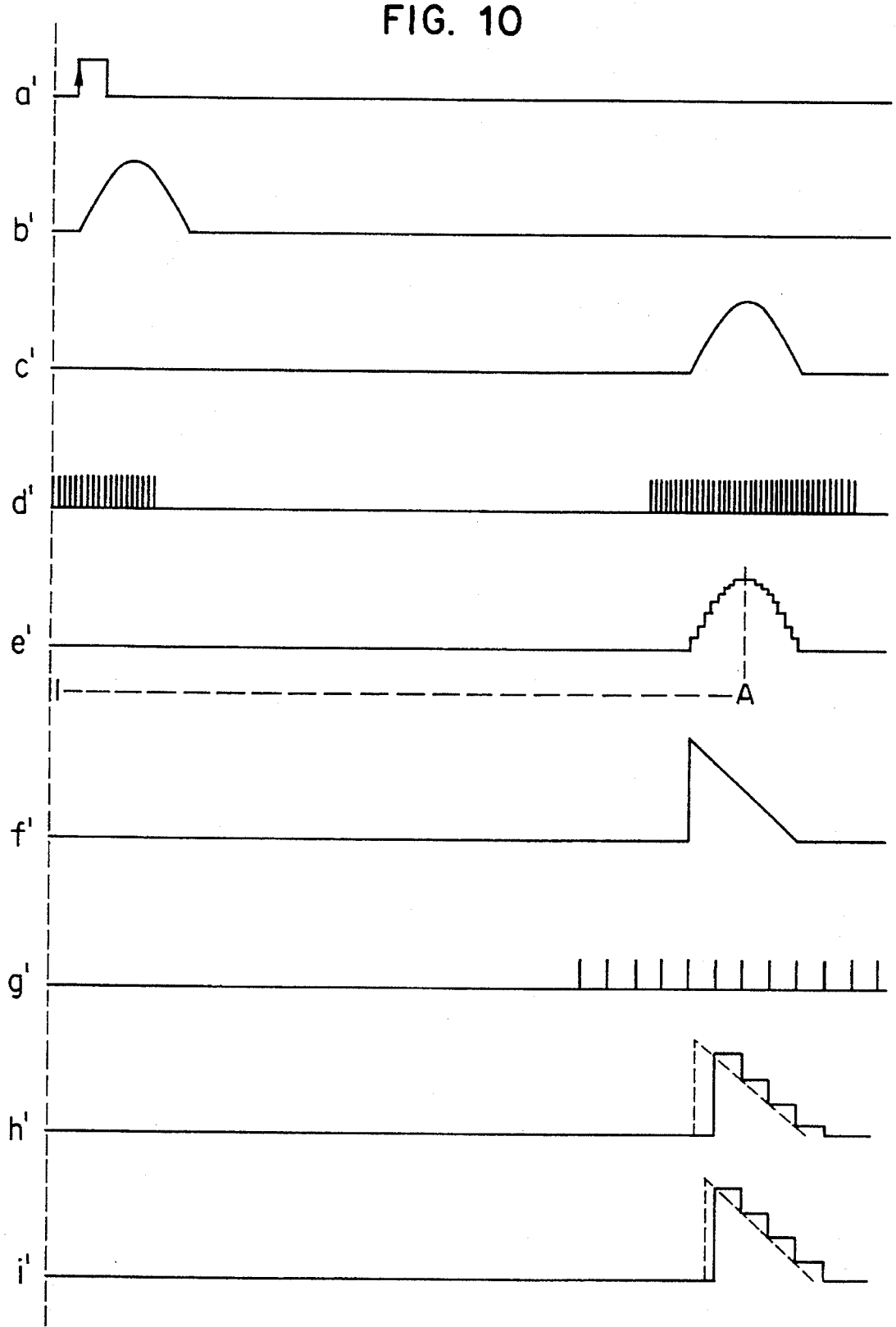
FIG. 10 is a diagram explaining the prior art of distance measurement.
Figure 11:
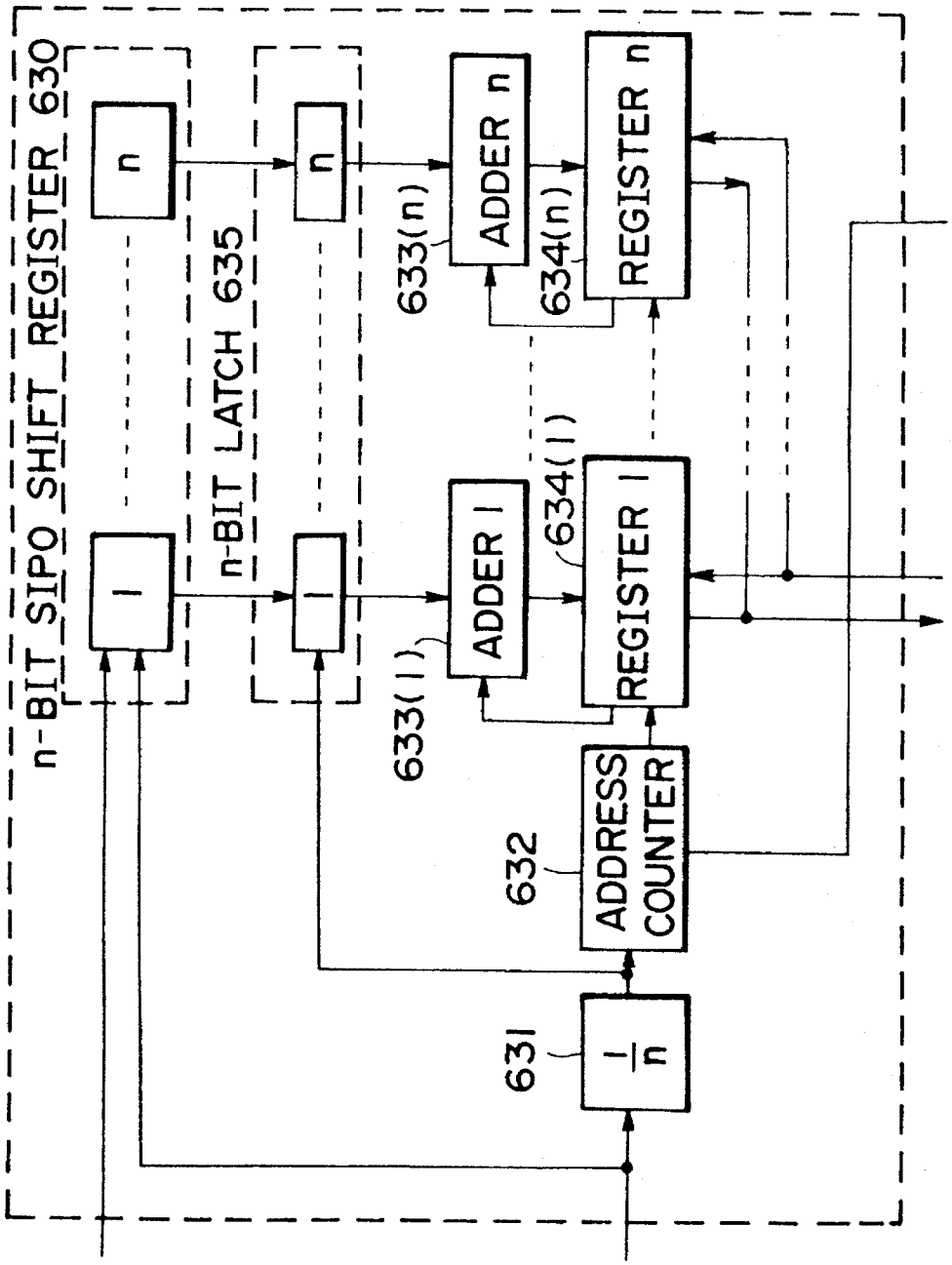
FIG. 11 is a diagram explaining the problem of the prior art.
Figure 12:
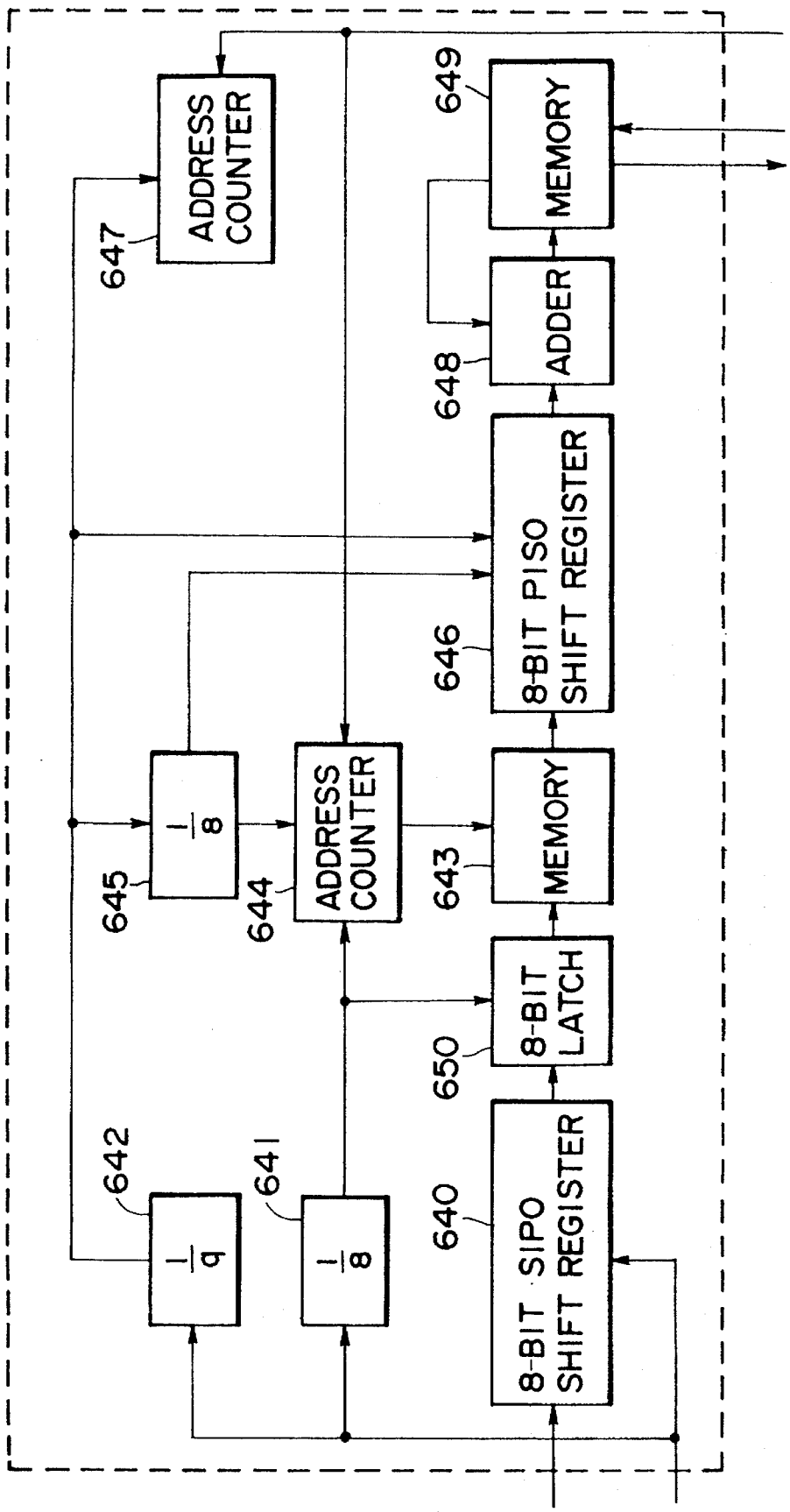
FIG. 12 is a block diagram used to explain the cumulation means based on a third variant embodiment of this invention.

It is certified that error appears in the above-identified patent and that said Letters Patent is hereby corrected as shown below:

Column 1, line 60, "for an" should read --for the--;

Column 1, line 61, "is the" should read --is an--;

Column 2, line 1, "FIG. 11" should read --FIG. 10--;

Column 2, bridging lines 51-52, "; FIG. 11 is a diagram explaining" should read --and--;

Column 2, line 54, "FIG. 12" should read --FIG. 11--;

Column 2, line 57, "FIG. 13" should read --FIG. 12--;

Column 6, line 34, "$\Delta s$" should read --$\Delta S$--;

Column 9, line 55, "deliver" should read --delivers--;

UNITED STATES PATENT AND TRADEMARK OFFICE
CERTIFICATE OF CORRECTION

PATENT NO. : 5,619,317

DATED : April 8, 1997

INVENTOR(S) : Ohishi et al.

It is certified that error appears in the above-identified patent and that said Letters Patent is hereby corrected as shown below:

Column 11, line 41, "FIG. 12" should read --FIG. 11--;

Column 12, line 16, "FIG. 13" should read --FIG. 12--;

Column 15, line 8, "sampling into" should read --sampling--;

Column 15, line 47, "devices" should read --device--.

Signed and Sealed this

Second Day of December, 1997

Attest:

Attesting Officer

BRUCE LEHMAN

Commissioner of Patents and Trademarks